L. MAYOLINO.
PNEUMATIC VEHICLE WHEEL.
APPLICATION FILED MAR. 25, 1916.

1,214,811.

Patented Feb. 6, 1917.
2 SHEETS—SHEET 1.

WITNESS

INVENTOR
Luis Mayolino
BY
ATTORNEY

L. MAYOLINO.
PNEUMATIC VEHICLE WHEEL.
APPLICATION FILED MAR. 25, 1916.
1,214,811.
Patented Feb. 6, 1917.
2 SHEETS—SHEET 2.
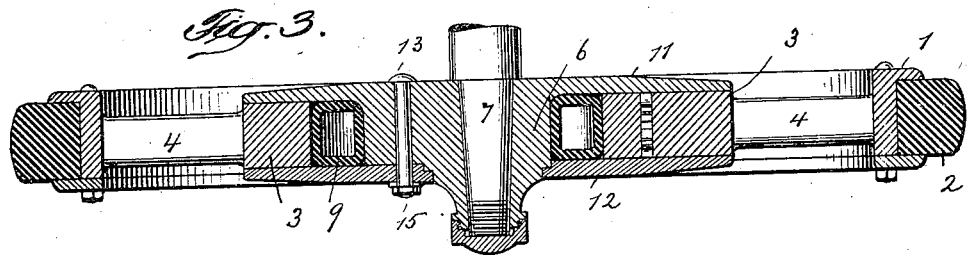
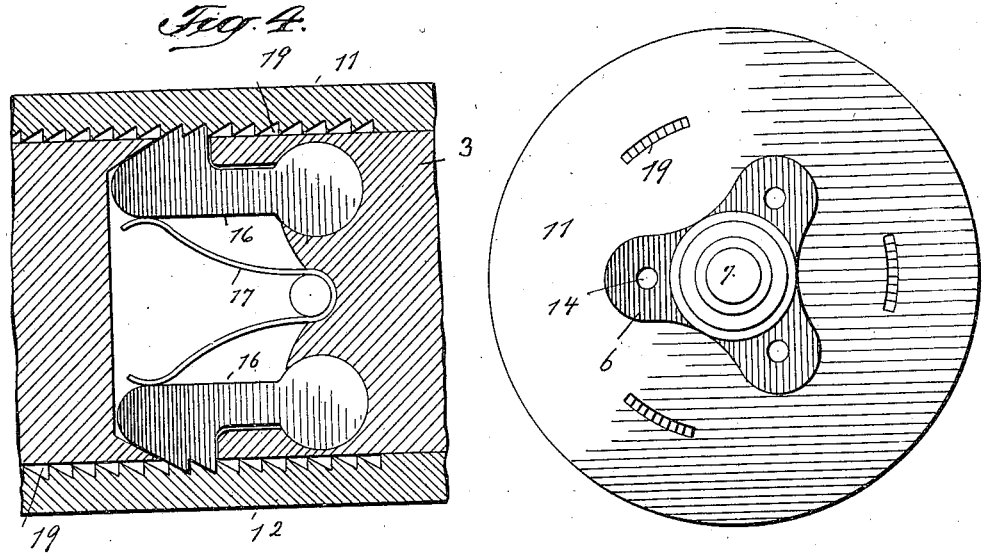
WITNESS
INVENTOR
Luis Mayolino
BY
ATTORNEY

UNITED STATES PATENT OFFICE.

LUIS MAYOLINO, OF HABANA, CUBA, ASSIGNOR TO RUEDAS Y NEUMATICOS MAYOLINO, OF HABANA, CUBA, A CORPORATION OF CUBA.

PNEUMATIC VEHICLE-WHEEL.

1,214,811.

Specification of Letters Patent.

Patented Feb. 6, 1917.

Application filed March 25, 1916. Serial No. 86,579.

*To all whom it may concern:*

Be it known that I, LUIS MAYOLINO, a citizen of the United States, and a resident of Habana, Cuba, have invented certain new and useful Improvements in Pneumatic Vehicle-Wheels, of which the following is a specification.

This invention relates to a vehicle wheel of the class in which the air tube is not applied to the rim of the wheel within the shoe, but is placed at a distance from said rim, and laid around the hub, so that while the cushioning effect of the air tube is retained, the tube is protected against punctures, and its life is greatly prolonged.

The invention comprises novel and efficient means for transmitting the movement of the hub to the wheel rim, when the tube is inflated or deflated and also, means for locking the rim to the hub during the deflated condition of the tube.

The invention further comprises various other features of construction more fully pointed out in the specification and appended claims.

Figure 1:
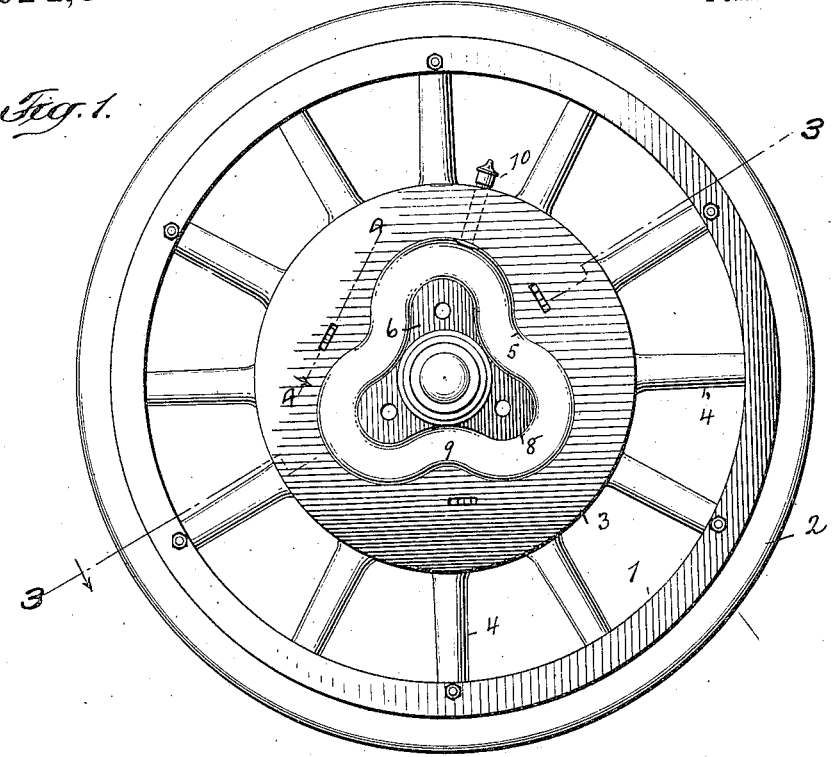
Figure 2:
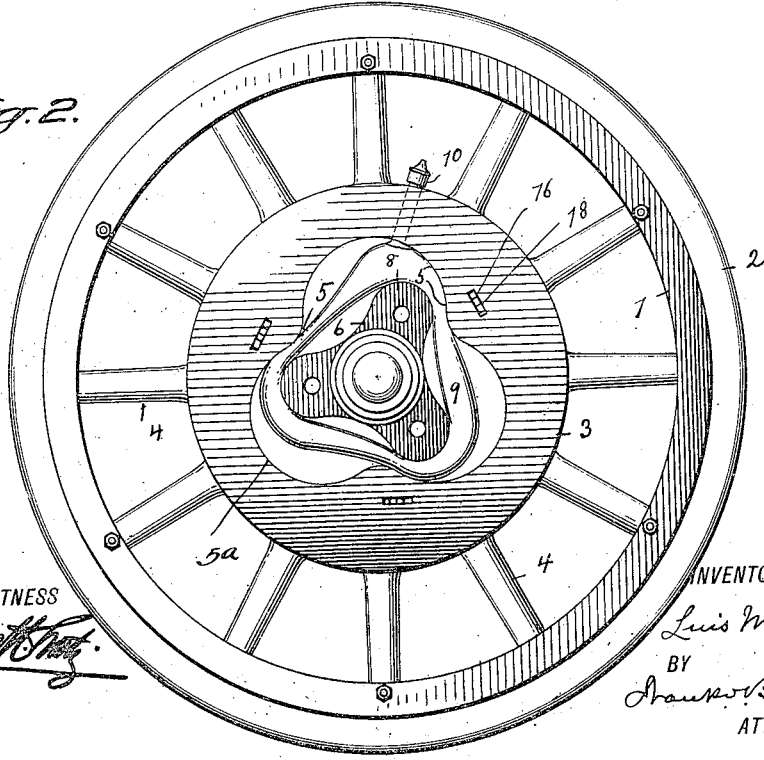

In the accompanying drawings: Figure 1 is a side view of a vehicle wheel embodying my invention with the detachable face plate removed and showing the air tube inflated; Fig. 2, a similar view with the air tube deflated; Fig. 3, an enlarged section on line 3—3 Fig. 1; Fig. 4, an enlarged section on line 4—4 Fig. 1; Fig. 5, a front view of the face plate carrying the hub, and Fig. 6, a diagram of portions of the rim and hub with the air tube omitted.

The wheel comprises essentially, an inner section that includes the hub, an outer section that includes the rim, and an interposed inflation tube by means of which motion is transmitted from the hub to the rim.

The rim 1 of the wheel, which is shown to carry a solid tire 2, encircles a concentrically arranged disk or outer member 3 connected to the rim by spokes 4. Disk 3 has a central opening defined by the inner perimeter of the disk, said perimeter being sinuous, so as to form a plurality of inwardly extending rounded projections 5 and a plurality of intervening rounded depressions 5ª.

Into the opening of disk 3, there extends an inner member 6 which is apertured centrally and constitutes the hub fitted on the axle 7. The outer perimeter of member 6 corresponds in shape substantially to that of the inner perimeter of disk 3, it being likewise of sinuous form, there being thus formed on member 6, a number of outwardly extending rounded projections 8 and a plurality of intervening rounded depressions. The correlation and relative size of the parts is such, that when the perimeter of member 6 is in parallelism with that of member 3, (which is the normal position), there will be formed between the members, a channel of uniform width (Fig. 1), while when the perimeters of the members are out of parallelism, the tips of projections 8 will operatively engage the tips of projections 5 (Figs. 2 and 6). In order to produce the last named result, the length of each projection 8 (measuring from the center of the wheel to the tip of the projection) is considerably less, than the maximum depth of each depression 5ª (measuring from the center of the wheel to the center of the depression). From this point of maximum depth, the inner perimeter of disk 3, gradually approaches the center of the wheel, to form the projections 5, the shape of the perimeter being such that, the distance from the center of the wheel to the sloping side walls of said projections, is less than the length of projections 8 Within the clearance formed between members 3 and 6 there is accommodated, an inflation tube 9, which may be charged by means of a nipple 10 that projects outwardly from disk 3, between a pair of spokes 4.

Hub 6 is carried by the plate 11 of a pair of face plates or members 11 and 12, that extend over opposite sides of disk 3, and are connected to each other by bolts 13, passing through apertures 14 of the hub and furnished with nuts 15. In this way, the face plates though rigidly connected to the inner section of the wheel are normally in movable relation to the outer, or rim-carrying section. During normal operation, the rotation of the hub will by the inflated tube 9 be transmitted to the disk 3, and consequently to the rim (Fig. 1). When, however, the tube should collapse, the rim section will hang back, and the hub section will thus be displaced relatively to the rim section, so that the projections 8 of the former will be brought to bear against the sloping side walls of projections 5, the intervening collapsed air tube now constituting a packing (Fig. 2). Thus, the motion of the hub section will now be transmitted to the rim section directly i. e. without the intervention of an air cushion, the projections 8 constituting cams that engage the projections 5 at such an angle as to insure a drive of the rim, and this change in transmission will be carried out without occasioning any perceptible jolt. The travel of the car may therefore continue, until such a time as may be convenient for the installation of a new tube.

Though during the direct or deflated transmission described, the movement of the car will suffice to center the hub within the rim section, additional means are shown to be provided by which such centering becomes fixed. For this purpose, there are tiltably mounted within cavities of disk 3, a plurality of pawls 16 arranged in pairs and actuated by springs 17. These pawls extend through slots 18 of disk 3 and are adapted to engage segmental racks 19, formed on the contiguous faces of plates 11, 12. When the air tube is inflated, the pawls are free to move across the smooth spaces of plates 11, 12 intermediate racks 19 along the lines of the wheel radii, so that the pawls do not check the cushioning action of the tube. When the tube becomes deflated, the racks 19 will glide over the pawls until the projections 8 of the hub section come into operative engagement with the projections 5 of the rim section. While the car is in motion, the drive on the hub section suffices to center the same within the rim section. When however, the car stops, the hub section would drop owing to the weight of the car body. This dropping is however, prevented for the reason that the hub section cannot turn forward on account of the contacting projections 8, 5 and cannot turn backward on account of the engagement of the pawls with the racks 19, the teeth of which permit the parts to be properly tightened up with different thicknesses of intervening deflated air tube sections. As the hub section and wheel section, thus become locked against independent turning, they become likewise locked against eccentric displacement or sagging, a relative turn of the hub section being required to center the projections of the former within the depressions of the latter.

It will be seen that with the wheel constructed as described, the inflation tube is placed entirely out of harm's way and is not liable to be punctured by obstructions on the roadbed. At the same time the desirable pneumatic cushioning of the wheel is retained, while furthermore, at a blow out, the size of the wheel is not diminished, and travel may continue without interruption.

I claim:

1. A wheel comprising a hub section having a sinuous outer perimeter to form a plurality of outwardly extending rounded projections and intervening rounded depressions, a rim section having a sinuous inner perimeter, to form a plurality of inwardly extending rounded projections having sloping side walls and intervening rounded depressions, and an air tube between the hub section and the rim section, the hub-projections being shorter than the depth of the rim depressions and longer than the distance of the sloping side walls from the wheel center, whereby the hub-projections are adapted to operatively engage said sloping side walls at a driving angle upon a deflation of the air tube, said hub section being centered within the rim section upon said deflation.

2. A vehicle wheel comprising a rim section having inwardly extending projections, a hub section having outwardly extending projections, an air tube between the rim section and hub section, and means for locking the outwardly extending projections against said inwardly extending projections, upon a deflation of said tube.

3. A vehicle wheel comprising a rim section having inwardly extending projections, a hub section having outwardly extending projections adapted to operatively engage said inwardly extending projections, an intervening air tube, a plurality of pawls on the rim section, a member carried by the hub section, and a plurality of segmental racks on said member which are adapted to be engaged by said pawls whereby the hub-projections are locked against the rim projections upon a deflation of the air tube.

4. A vehicle wheel comprising a rim section, having inwardly directed projections, a hub section having outwardly directed projections adapted to operatively engage the inwardly directed projections of the rim section, a pneumatic tube interposed between said sections, a face plate carried by the hub section, said face plate having racks, and pawls carried by the rim section and adapted to engage said racks whereby the hub-projections are locked against the rim-projections upon a deflation of the air tube.

LUIS MAYOLINO.